US012698808B2

(12) United States Patent
Van Hullebusch et al.

(10) Patent No.: US 12,698,808 B2
(45) Date of Patent: Aug. 4, 2026

(54) SAFETY CLUTCH FOR AN AGRICULTURAL VEHICLE

(71) Applicant: CNH Industrial Belgium N.V., Zedelgem (BE)

(72) Inventors: Bart Van Hullebusch, Knesselare (BE); Sven Monbaliu, Zedelgem (BE)

(73) Assignee: CNH Industrial Belgium N.V. (BE)

( * ) Notice: Subject to any disclaimer, the term of this patent is extended or adjusted under 35 U.S.C. 154(b) by 0 days.

(21) Appl. No.: 18/895,523

(22) Filed: Sep. 25, 2024

(65) Prior Publication Data

US 2025/0102024 A1    Mar. 27, 2025

(30) Foreign Application Priority Data

Sep. 25, 2023    (EP) ..................................... 23199424

(51) Int. Cl.
F16D 7/10          (2006.01)

(52) U.S. Cl.
CPC ..................................... F16D 7/10 (2013.01)

(58) Field of Classification Search
CPC ................. F16D 7/06–10; F16D 15/00; F16D 43/204–20
See application file for complete search history.

(56) References Cited

U.S. PATENT DOCUMENTS

| | | | |
|---|---|---|---|
| 2,115,958 A | 5/1938 | Leif | |
| 2,202,497 A * | 5/1940 | Landahl | F16D 43/2028 |
| | | | 464/37 |
| 2,519,848 A | 8/1950 | Osterdahl | |
| 2,570,585 A * | 10/1951 | Murphy | F16D 11/16 |
| | | | 192/56.5 |
| 3,561,576 A * | 2/1971 | Lutz | F16D 43/208 |
| | | | 192/79 |
| 7,040,470 B2 * | 5/2006 | Dion | F16D 43/208 |
| | | | 192/56.3 |
| 8,366,560 B2 * | 2/2013 | Lee | F16D 7/10 |
| | | | 464/160 |
| 9,016,452 B2 * | 4/2015 | Hyun | F16D 43/208 |
| | | | 464/37 |
| 10,455,754 B2 | 10/2019 | Giuliani et al. | |
| 11,635,112 B2 * | 4/2023 | Seminel | F16D 7/08 |
| | | | 464/46 |
| 2019/0133046 A1 | 5/2019 | Standaert et al. | |
| 2021/0137020 A1 | 5/2021 | De Leener et al. | |

FOREIGN PATENT DOCUMENTS

DE          1575735 A1     1/1970

OTHER PUBLICATIONS

The Extended European Search Report issued Mar. 1, 2024, by the European Patent Office in corresponding European Patent Application No. 23199424.5-1012. (7 pages).

* cited by examiner

*Primary Examiner* — James J Taylor, II

(74) *Attorney, Agent, or Firm* — Buchanan Ingersoll & Rooney PC

(57)          ABSTRACT

A safety clutch for an agricultural vehicle includes a driven rotational element having a recess and a roller configured to be received in the recess. The roller is configured to move between positions depending on the relative torque between the roller and the driven rotational element such that the roller either drives rotation of the driven rotational element or does not. An actuator moves the position of the roller.

18 Claims, 9 Drawing Sheets

SAFETY CLUTCH FOR AN AGRICULTURAL VEHICLE

CROSS REFERENCE TO RELATED APPLICATION

This application claims priority to European Patent Application No. 23199424.5, filed Sep. 25, 2023, the content of such application being incorporated by reference herein in its entirety.

BACKGROUND OF THE INVENTION

Agricultural vehicles often have components with a large amount of rotational energy. In the event of a blockage or the like, which can be common in agricultural vehicles, this rotational energy needs to be dissipated correctly.

One example of such a component with high rotational energy is a flywheel, which is used to store and regulate rotational energy provided by a power take-off (PTO). In the example of a hay baler, the flywheel is typically connected to a gearbox and/or various baler components, such as a plunger, pickup reel and augers to provide energy for these components to operate. The flywheel, PTO, and gearbox form an interconnected system that ensures a consistent power supply and controlled distribution of energy within the hay baler. This setup allows the baler to handle the variable nature of the hay or straw being processed while maintaining a steady and efficient baling process.

Shear pins may be used in agricultural vehicles. Shear pins are designed to be coupled with various rotational components and are designed to protect equipment, especially rotating machinery, from damage caused by sudden overloads or jams. A shear pin is a sacrificial component that is intentionally weaker than other parts of the machinery it is designed to protect. The purpose of the shear pin is to break or shear off under excessive stress, preventing further damage to more critical and expensive components. During normal operation, the shear pin transmits torque or force from one part of the machine to another, just like a regular pin or bolt. However, if the machinery encounters an overload or jam, the force on the shear pin becomes too great for it to handle.

When the torque exceeds the shear pin's designed limit, the pin will break or shear off at a predetermined point. This action effectively disconnects the affected components, preventing the transfer of excessive force to more critical parts of the machine, which could otherwise lead to more extensive damage or expensive repairs.

However, the problem with shear pins is that the agricultural vehicle needs to stop, and the shear pin replaced in the result of a shear pin breakage. Replacement of a shear pin can be time-consuming and a difficult, potentially hazardous process for an operator to do and cause downtime during the replacement process. Shear pins are often located in difficult to access positions. In addition, an operator is required to have a spare shear pin available to replace the broken one to begin the process again.

An additional problem in hay balers is that collisions between needles and the plunger can occur as a result of mistiming in the process. In some machines, a plunger stop is used to prevent these collisions. However, due to increasing inertia of drivelines (such as flywheels), the use of a plunger stop can result in a massive amount of energy needing to be dissipated extremely quickly and so plunger stops are less common in modern, large format, hay balers.

However, it would be desirable to have a way of safely reintroducing plunger stops into agricultural machinery again.

It is an object of the present disclosure to overcome at least one of the above-mentioned problems.

SUMMARY OF THE INVENTION

The present invention relates to a safety clutch for an agricultural vehicle, an agricultural vehicle and a method of operating the safety clutch.

According to a first aspect, there is provided a safety clutch for an agricultural vehicle comprising a driven rotational element comprising a recess; and a roller configured to be received in the recess of the driven rotational element; a biasing unit configured to urge the roller into the recess with a biasing force, wherein the roller is configured to move between: a first position in which the roller is seated in the recess of the driven rotational element to drive the driven rotational element to rotate; and a second position in which the roller is unseated from the recess of the driven rotational element, and an actuator operable to move the roller from the first position to the second position in response to an override input; wherein the roller is configured to move between the first position and second position in response to: a relative torque between the roller and driven rotational element overcoming the biasing force; and/or the actuator moving the roller in response to the override input.

The safety clutch provides a mechanism for quickly breaking the mechanical link between the power take-off and/or flywheel and one or more operational components of the agricultural vehicle. The safety clutch as described in the claims obviates the requirement for a traditional shear pin and so reduces the amount of downtime in an agricultural vehicle. It also reduces possible risks relating to a user injuring themselves whilst replacing a shear pin.

The safety clutch also provides a mechanism to allow the operator and/or software to provide an override input to disconnect the driving rotational element from the driven rotational element on demand and so improves the control of an operator and reduces the risk of damage to agricultural vehicle components.

In one example, in a first mode of operation the roller is configured to move between the first position and second position in response to a relative torque between the roller and driven rotational element overcoming the biasing force; and wherein in a second mode of operation the actuator is configured to move the roller between the first position and the second position in response to the override input. The first mode may be considered to be a normal mode and the second mode may be considered to be an override mode.

The biasing unit may comprise a pivot arm comprising a pivot, wherein the pivot arm is configured to be coupled with a driving rotational element; a resiliently deformable member configured to provide the biasing force; and a lever configured to pivot about the pivot of the pivot arm, wherein the lever is coupled to the resiliently deformable member on a first side of the pivot and rotatably coupled with the roller on a second side of the pivot.

This arrangement provides a mechanism in the safety clutch for biasing the roller in the first position.

The resiliently deformable member may also be referred to as a force arm. The force arm may comprise a spring (which is deformable) and a rod (which is rigid). The spring is configured to extend around a portion of the rod. The rod is configured to be attached to the lever, in use.

The pivot arm may comprise an alignment opening through which a rod of the resiliently deformable member is configured to extend.

This alignment opening provides an effective method of coupling the resiliently deformable member with the lever arm to ultimately provide a bias force to the roller.

The rod extends between the lever and a first end plate, wherein the resiliently deformable member comprises a spring configured to extend around part of the rod between the first end plate and a second end plate, wherein the second end plate is forcibly coupled with a platform of the pivot arm. The alignment opening is located in the platform of the pivot arm.

In one example, the biasing unit is rotatable about a rotational axis of the driven rotational element. Rotating the biasing unit together with the rotational axis of the driven rotational element means provides an effective way of providing a biasing force to the roller.

The recess of the driven rotational element may comprise a concave region.

The concave region enables the recess to be seated in the recess in the first position to as to allow a transmission of torque between the roller and the driven rotational element.

The concave region may be adjacent to one or more convex regions. The convex region(s) provide a "shoulder" up against which the roller is configured to push to drive the driven rotational element, when the roller is in the first position. The convex region is shaped such that the roller can effectively "roll out" of the recess if the relative torque between the roller and the driven rotational element exceeds the biasing force the urges the roller into the recess.

The driven rotational element may comprise a disc with a recess in a periphery of the disc. The disc shaped driven rotational element is suitable for rotation.

The driven rotational element may comprise a shear arm comprising a recess at one end, wherein the shear arm is rotationally coupled with a disc. The shear arm may provide an additional mechanism for transmitting the relative torque from the roller to the driven rotational element.

In use, the driven rotational element may be configured to be rotated through 360 degrees about a rotational axis of the driven rotational element. The driven rotational element is suitable for use in the drive line of an agricultural vehicle in which there would be rotation of components.

The roller may be configured to be urged against the driven rotational element in the second position by the biasing force, the safety clutch may comprise a rotational speed monitor to determine the rotational speed of the driven rotational element.

The rotational speed monitor can provide data, that can be used to determine when the roller can be re-engaged with the driven rotational element after it has been moved to the second position.

The safety clutch may comprise a locking mechanism configured to lock the roller in the second position after the roller has transitioned from the first position to the second position. The locking mechanism aids the avoidance of "hammering", which would occur due to the roller being urged against a surface of the driven rotational element (when in the second position) due to the biasing force. The locking mechanism can lock the roller in the second position such that the roller is not urged back to the first position.

The locking mechanism may be configured to be released to urge the roller from the second position to the first position in response to a rotational speed of the driving rotational element being reduced to less than a predetermined speed. In some examples, the roller can be effectively re-engaged with the driven rotational element, when the driving rotational element (and therefore, the roller) is rotating at a relatively slow speed.

The rotational speed of the driving rotational element may be reduced to below the predetermined speed by use of a gearbox between a power take-off and the driving rotation element. A gearbox (also known as an intermediate gearbox) is an effective manner for reducing the rotational speed of the driving rotational element.

The locking mechanism may be configured to be released to urge the roller from the second position to the first position in response to the driving rotational element having 0 rpm. In some configurations, the roller is only suitable for re-engagement back to the first position when the driving rotational element is not rotating.

The driving rotational element may comprise a flywheel.

The actuator is configured to move the roller to an intermediate position between the first and second position to reduce the amount of relative torque between the roller and driven rotational element overcoming the biasing force.

In this manner, the actuator can be used to move the roller intermediate position such that the relative torque required to move the roller to the second position can be reduced. That is to say that a user could effectively reduce the relative torque required to stop rotation of the driven rotational element, as desired.

The safety clutch may comprise a plurality of rollers, wherein each roller is configured to be received in a correlating recess in the driven rotational element.

The safety clutch may comprise a plurality of actuators, wherein each actuator is configured to move a corresponding roller.

A first actuator of the plurality of actuators is configured to situate a first roller of the plurality of rollers in the first position, and a second actuator of the plurality of actuators is configured to locate a second roller of the plurality of rollers in the second position. Providing multiple actuators and rollers provides more control over the total required relative torque required to break the connection with the driven rotational element.

In one aspect, there is provided an agricultural vehicle or trailed agricultural accessory comprising the safety clutch as described above.

In one aspect, there is provided a method of operating the safety clutch comprising: actuating the actuator to move the roller from the first position to the second position.

DETAILED DESCRIPTION OF THE DRAWINGS

The safety clutch 100 of the present invention is designed to provide a safety feature to replicate a shear pin, but which results less downtime to an operator and improves the safety of the agricultural vehicle. The safety clutch 100 can quickly break a link in the driveline (for example between the flywheel and driven components) in an agricultural vehicle, but without the need for a sacrificial component such as a shear pin, so provides a more efficient safety solution, which avoids the needs of an operator to uninstall a broken shear pin and reinstall a replacement.

Figure 1:
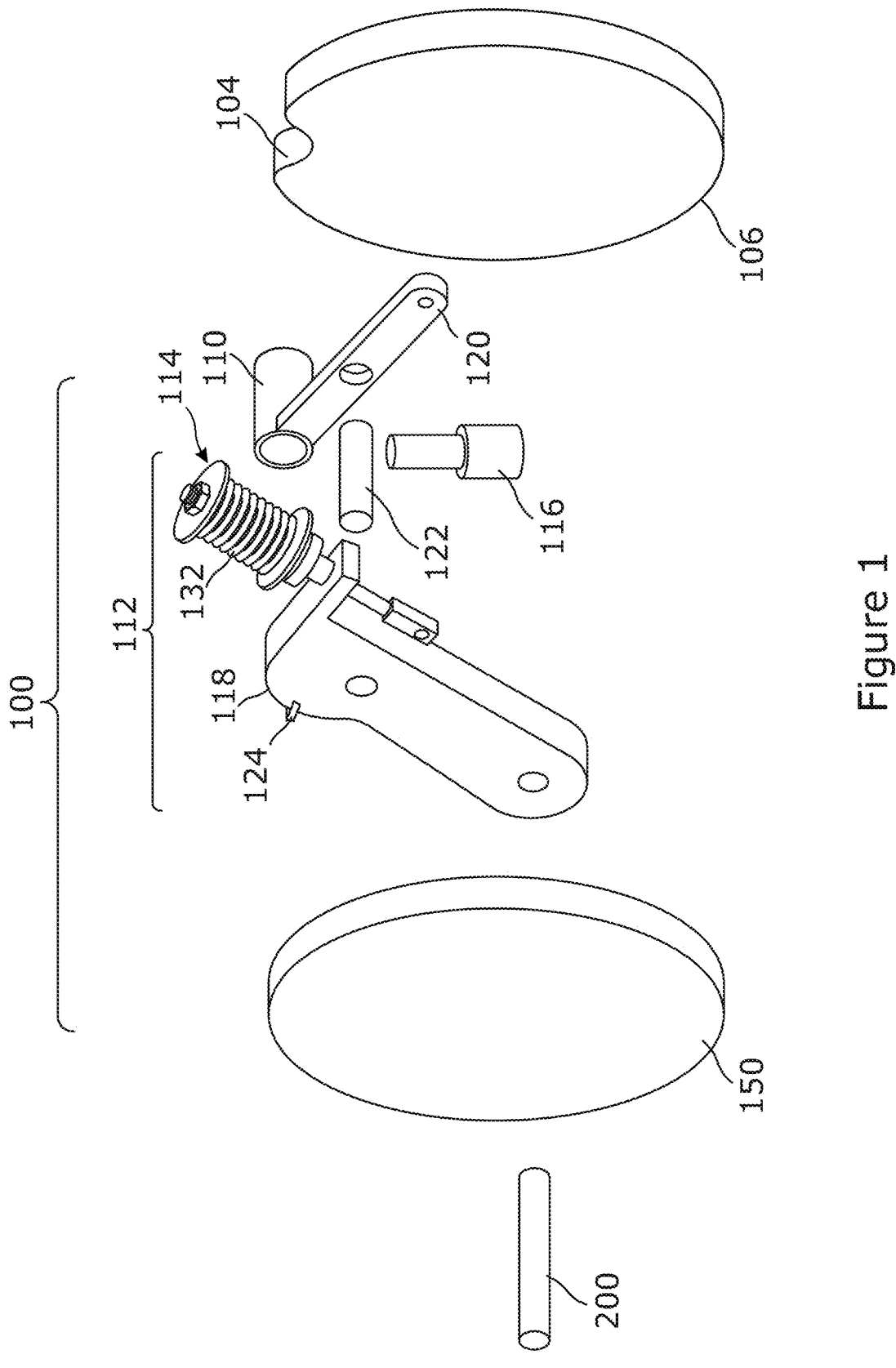
FIG. 1 shows an exploded view of an example of a safety clutch.

FIG. 1 shows an exploded view of an example of the safety clutch 100 and power take off 200.

In examples, the power take-off 200 is coupled with a driving rotational element 150, such as a flywheel or the like. The driving rotational element 150 is configured to transmit the rotational energy from the power take off 200 to the operational components of the agricultural vehicle, such as a baler, plunger or the like.

As shown in the example of FIG. 1, the driving rotational element 150 is configured to be coupled with the shear clutch 100 (note that in some examples, the shear clutch 100 may be considered to include the driving rotational element 150 itself, in which case the shear clutch would 100 would be considered to be coupled with the power take-off 200 itself).

The safety clutch 100 includes a driven rotational element 102 comprising a recess 104. As will be described in more detail below, the driven rotational element 102 may be referred to as a shearhub, or the like. The driven rotational element 102 is configured to be part of an operational component of an agricultural vehicle, such as a baler or the like, or alternatively be an intermediate component in the driveline between the power take-off and an operational component of the agricultural vehicle. That is to say that torque is transmitted to, and travels through the driven rotational element 102, in use.

In some examples, the driven rotational element 102 comprises a disc 106 which has a substantially circular profile with the recess 104 located therein, for example, the recess may be located in a periphery of the disc 106 in an otherwise circular profile. In some examples, the driven rotational element 102 comprises a shear arm 108. The recess 104 may be formed in the shear arm 108 of the driven rotational element 102. In some examples, both the disc 106 and the shear arm 108 comprise the recess 104. These examples are shown in more detail in FIGS. 6A and 6B described below, in some examples the recess 104 is only located in the shear arm 108.

The shear clutch 100 also includes a roller 110 that is configured to be received in the recess 104 of the driven rotational element 102. The roller 110 is configured to be able to be seated in the recess 104 in use, but also roll-out out the recess under certain conditions as will be described in more detail below. Effectively, the roller 104 is the component in the apparatus that is configured to transmit torque (rotational force) originating from the driving rotational element 150 to the driven rotational element 102, in use.

The roller 110 is configured to rotate about an axis parallel to the axis of the driven rotational element 102. In other words, the rotational axis of the roller 110 is parallel to the rotational axis of the driven rotational element 102. In use, the driven rotational element 102 is configured to rotate 360 degrees about its rotational axis.

The safety clutch 100 includes a biasing unit 112 configured to urge the roller into the recess 104 with a biasing force. In some examples, the biasing unit 112 comprises a resiliently deformable member 114, such as a spring or the like. The biasing unit 112 may be directly coupled to the roller 110, or be coupled via an intermediate link, as will be described in more detail below.

The biasing unit 112 is configured to urge the roller 110 into the recess 104 with a biasing force.

The roller 110 is configured to move between a first position and a second position. In the first position, the roller 110 is seated in the recess 104 of the driven rotational element 102 to drive the driven rotational element 102 to rotate. In other words, torque transmitted to the roller 110 from the driving rotational element 150 is configured to be transmitted to the driven rotational element 102, due to the roller 110 being seated in the recess 104 of the driven rotational element 102.

However, if the torque transmitted by the roller 110 is sufficient to overcome the biasing force provided by the biasing unit 112, then the roller 110 will roll out of the recess 104 to a second position, thereby breaking the transmission link between the driving rotational element 150 and the driven rotational element 102. In other words, in the second position, no torque is transmitted from the driving rotational element 150 to the driven rotational element 102. That is to say that the safety clutch 100 is configured to effectively provide the same function as a shear pin in that if the torque exceeds a threshold value, the force link is broken. However, in this case, no components are damaged. In the second position, the driving rotational element 150 would continue to rotate due to the connection with the power take-off. However, the driven rotating element 102 would only continue to rotate under its own inertia and slow to a stop.

In addition, the safety clutch 110 comprises an actuator 116 that provides a secondary mechanism for moving the roller 110 from the first position to the second position. The actuator is shown schematically in FIG. 1. The actuator 116 may be configured to urge the roller 110 out of the recess 104 in response to an override input, which will be discussed in more detail below. The actuator 116 may take the form of a piston, a fluid actuator or an electromechanical actuator or the like. The actuator 116 may be directly coupled with the roller 110 or alternatively be indirectly coupled with the roller 110 via a link.

In one example, the biasing unit 112 also includes a pivot arm 118. The pivot arm 118 is configured to be coupled with the driving rotational element 150 and to move with the driving rotational element 150, in use. That is to say that the pivot arm 118 and the driving rotational element 150 are configured to rotate about the same rotational axis. The pivot arm 118 is shown in more detail in FIGS. 2 and 3A to 3C. The pivot arm 118 is rotationally coupled to a lever 120 about a pivot 122. Again, these are shown and described in more detail in FIGS. 2 and 3A to 3C below.

Figure 2:
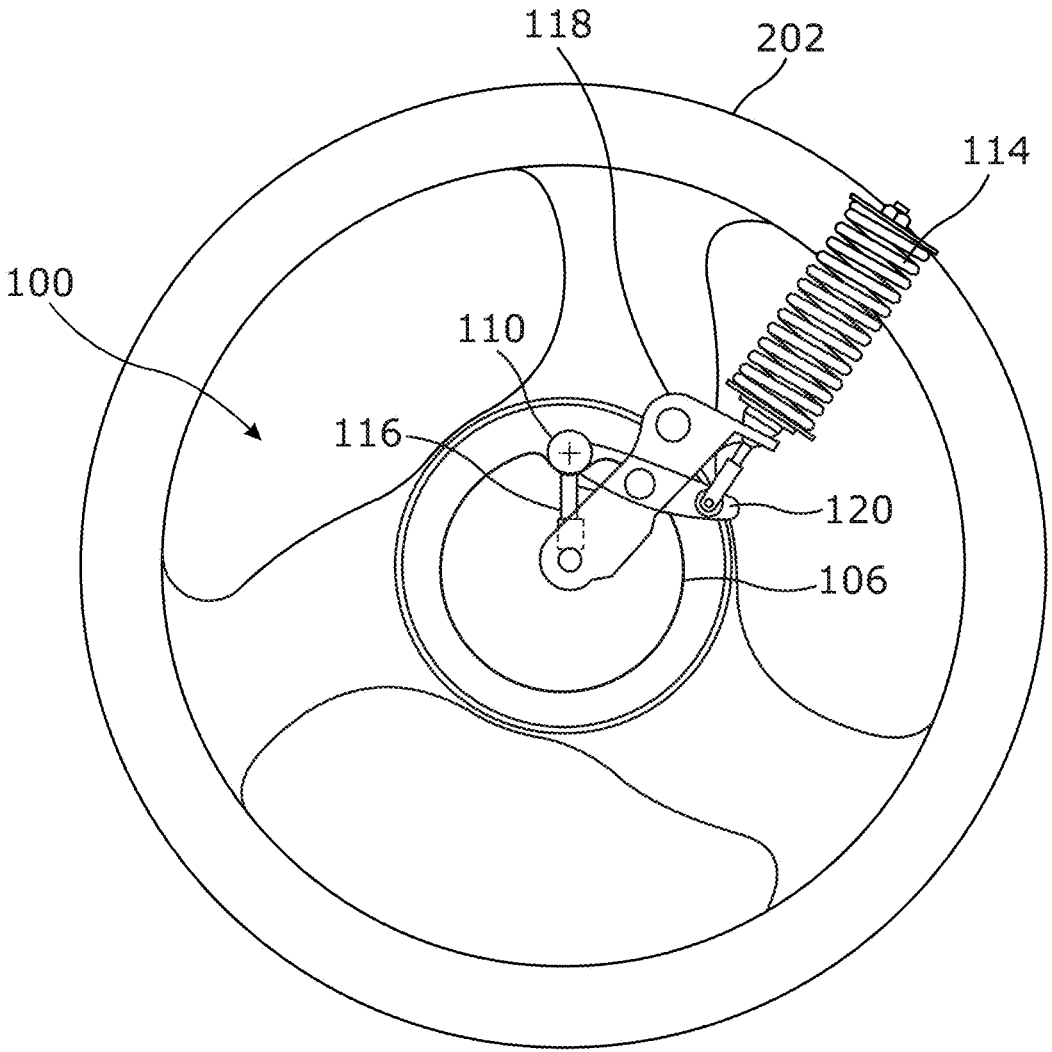
FIG. 2 shows a side view of an example of the safety clutch and baler, wherein the roller is in the first position.

FIG. 2 shows a side view of the safety clutch 100 coupled with a rotational component 202, of an agricultural vehicle. Examples of rotational components 202 of an agricultural vehicle include rotor cut-out clutch, knotter mechanism, stuffer mechanism rollers or the like. The safety clutch 100 is shown in more detail in FIGS. 3A to 3C.

In these examples, the recess 104 is shown in the disc 106 itself (for example, the shear hub). As explained previously, in other examples the recess may alternatively or additionally be in the shear arm 108 (not shown in FIGS. 2 and 3).

Figure 3A:
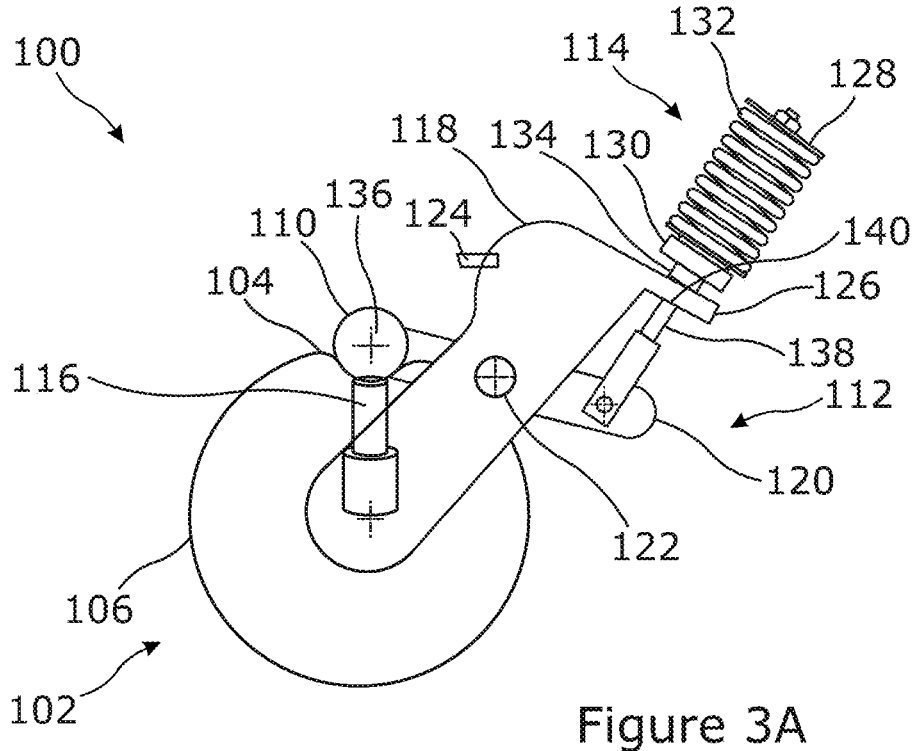
FIG. 3A shows a side view of an example of the safety clutch in more detail, wherein the roller is in the first position.

FIGS. 2 and 3A to 3C also show the biasing unit 112 in more detail. The biasing unit 112 includes a pivot arm 118, a lever 120 and a resiliently deformable member 114. The pivot arm 118 is configured to be coupled with the driving rotational element 150 (not shown in FIG. 3A) and to move with the driving rotational element 150 in use. The pivot arm 118 defines a pivot 122 having a pivot axis about which the lever 120 is pivotably coupled. That is to say that the lever 120 is rotatable relative to the pivot arm 118 about the pivot 122. The pivot arm 118 may also have a platform 126 on which a part of the resiliently deformable member 114 may be mounted. In FIG. 3A, the platform 126 is shown at the end of the pivot arm 118. The platform 126 may extend in a direction substantially perpendicular to a longitudinal axis of the pivot arm 118.

A first end of the lever 120 is rotatably connected with the resiliently deformable member 114. The lever 120 is rotationally coupled to the roller 110 at a second end. In other words, the roller 110 is free to rotate about its rotational axis, in use. In other words, the pivot 122 is located between the first end and second end of the lever 120 such that an upwards movement at the first end of the lever would result in a downwards movement at the second end (and visa-versa). Put another way, the lever 120 is coupled to the resiliently deformable member 114 on a first side of the pivot 122 and is rotatably coupled with the roller 110 on a second side of the pivot 122.

In some examples, the resiliently deformable member 114 comprises a connection portion, such as a rod 138. The rod 138 is configured to transfer the biasing force from the resiliently deformable member 114 to the lever 120. The rod 138 runs through an opening (not shown) in the platform 126 of the pivot arm 118. In some examples the rod 138 runs through a spring 132 of the resiliently deformable member 114 and couples with a first end plates 128 and a second end plate 130 of the resiliently deformable member 114. The resiliently deformable member 114 may comprise a spring 132 (or similar) located between the end plates 128, 130.

One end of the lever 120 is pivotably connected to the resiliently deformable member 114 (for example, the rod 138 of the resiliently deformable member). The rod 138 is connectable to the first end plate 128 in the following manner: a screw engages with the threaded end of the rod 138. The spring 132 is under compression and pushes against the platform 126 (via the second end plate 130 and ball-shaped connection piece 134) and the first plate 128. The rod 138 is coupled with the first end plate 128, which is urged away from the platform 126 due to the pre-compression force of the spring. This pre-compression force acts on the rod 138 which exerts a "pull force" on the lever 120. The spring force (or biasing force) is thus exerted between the lever 120 and the pivot arm 118. in other words, the spring 132 acts to 'pull' the second end of the lever 120

(e.g. the end of the lever 120 opposite the end carrying the roller 110), via the rod 138, towards the platform 126 of the pivot arm 118.

A limited movement of the spring with respect to the platform 126 is made possible by a ball-shaped connection piece 134 between the second end plate 130 of the spring 132 and the platform 126.

The other end of the lever 120, opposite to the second end carries the roller 110 that is rotatable with respect to the lever 120 about its rotation axis 136. The roller 110 is lodged in the recess 110 at the top of the driven rotational element 102.

The lever 120 acts to push the roller 110 against the recess 110 with a biasing force determined by the spring's 132 pre-compression and the dimensions of the lever 120 and position of the pivot 122.

As long as the roller 110 is locked into the recess 104 in this manner, the pivot arm 118, the lever 120 and the biasing unit 112 form a single structure configured to rotate together with the driving rotational element 150.

In operation, the roller 110 is effectively a force transmission link between a driving rotational element 150 and the driven rotational element 102, which in turn may form part of or being coupled with agricultural apparatus such as a baler 202 etc.

However, in some examples the driven rotational element 102 may be subject to an overload force. For example, if a solid object (such as a rock) is struck by the operational component of the agricultural vehicle, then this can effectively cause a "break force" which is transmitted back to the driven rotational element 102. As a result, there is a difference in torque between the driving rotational element 150 and the driven rotational element 102. As such, the roller 110 will push against the recess 104 and if the difference in torque is sufficient to overcome the biasing force provided by the biasing unit 114, the roller 110 will roll out of the recess 104, thereby disconnecting the torque transfer path between the driving rotational element 150 and the driven rotational element 102.

If the overload force is not sufficient to overcome the biasing force, then the roller 110 will stay seated in the recess 104.

Figure 3B:
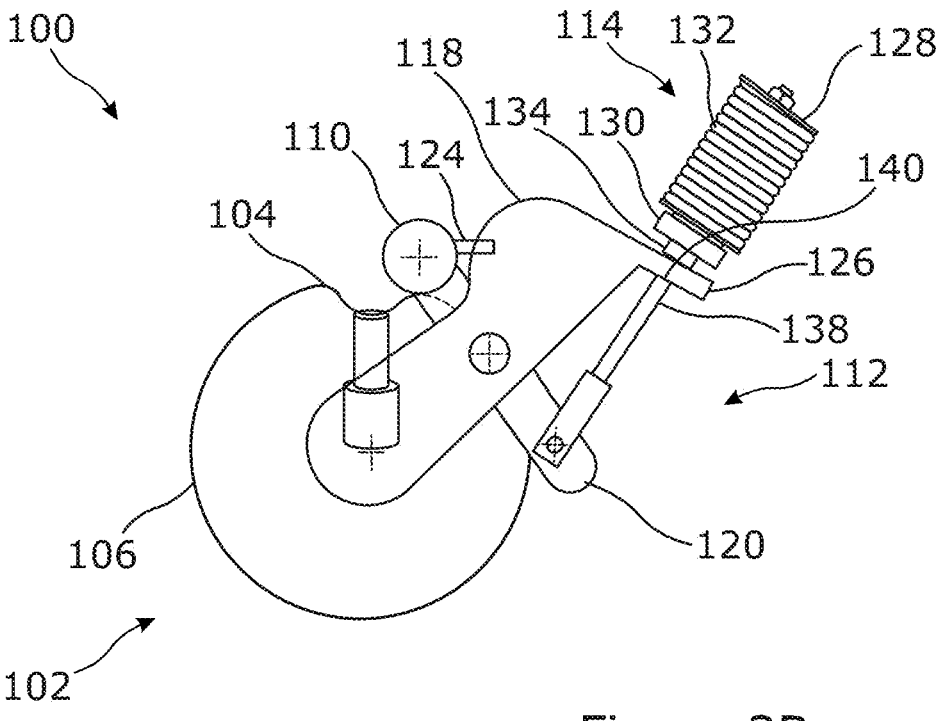
FIG. 3B shows a side view of the example of the safety clutch shown in FIG. 3A, with the roller in the second position.

FIG. 3B shows an example in which the overload force is sufficient to overcome the biasing force and the roller 110 has rolled out of the recess 104. There is a relative rotation between the pivot arm 118 and the driven rotating element 106. The biasing unit 112 is pivotably coupled with the pivot arm 118 and so moves together with the pivot arm 118.

Figure 3C:
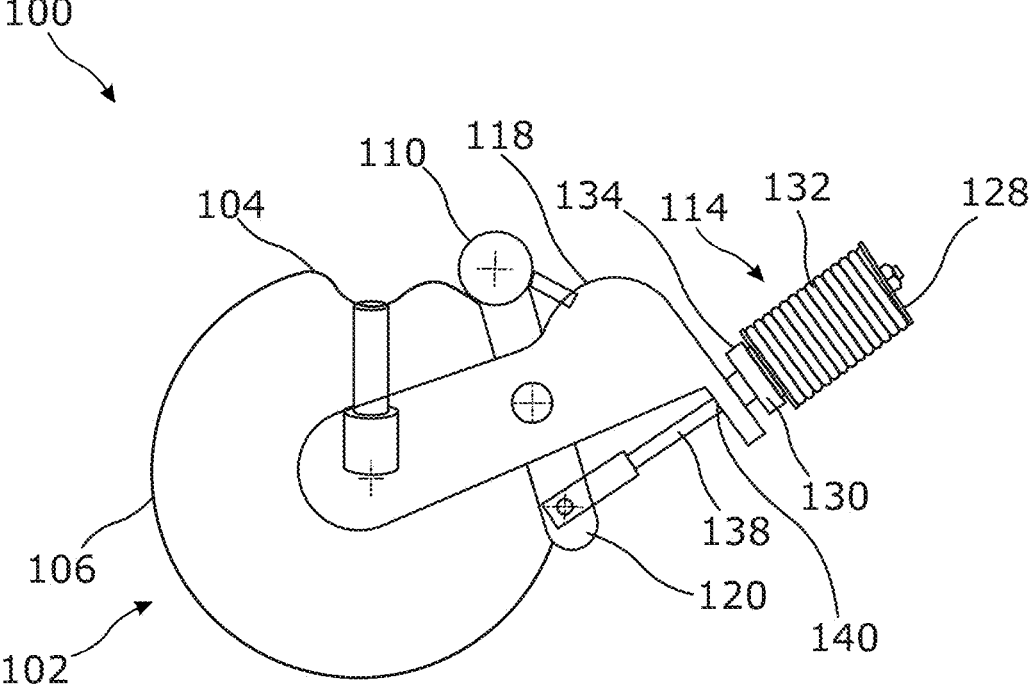
FIG. 3C shows a side view of the example of the safety clutch shown in FIG. 3A, with the roller in the second position with additional rotation of the biasing unit relative to the driven rotational element.

FIG. 3C shows an example in which there has been further relative rotation between the lever arm 118 and the driven rotational element 102. In the examples in FIGS. 3B and 3C, the roller 110 is considered to be in the second position as it is not seated in the recess 104 to transfer torque. In the example in FIG. 3A, the roller 110 is considered to be in the first position as torque is transmitted from the driving rotational element 150 to the driven rotational element 102. FIG. 3C shows the roller 110 in the second position with additional rotation of the biasing unit 112 relative to the driven rotational element.

In FIGS. 3B and 3C, the driven rotational element 102 would continue to rotate (assuming that it is still provided with energy from the power take-off. The biasing force would continue to act on the roller and as such, the roller 110 will effectively rotate around the outside of the driven rotational element 102 and "hammer" against the recess 104 when the roller 110 aligns with the recess 104 (e.g. after a full relative rotation).

This hammering function can be problematic and can potentially damage the safety clutch 100 in some situations.

As such, the safety clutch 100 may comprise a locking mechanism 124, such as a latch or lock that is configured to retain the roller 110 in the second position. The locking mechanism 124 could take the form of flyweight or actuator (e.g. ram) or the like and is shown schematically in FIGS. 3B and 3C. The locking mechanism 124 may be controlled mechanically or with the aid of electronics. In these examples, it is connected to the pivot arm 118, but other examples of locking mechanism are envisaged.

In other examples, this hammering function can potentially be a useful feedback mechanism. For example, when the safety clutch 100 is part of a rotor cutout clutch, then it may be interesting information/useful to allow the roller 110 to hammer in the recess 104 such that the roller 110 may automatically move back to the first position when the relative rotational speeds between the roller 110 and the recess 104 drops to below a threshold level. The safety clutch 100 may comprising a rotational speed monitor to determine the rotational speed of the driven rotational element 102 in this example.

In some examples, the locking mechanism 124 is configured to be released to urge the roller 110 from the second position to the first position in response to a rotational speed of the driving rotational element 150 being reduced to less than a predetermined speed. For example, the rotational speed of the driving rotational element 150 may be reduced to below the predetermined speed by use of a gearbox (not shown) between the power take-off 200 and the driving rotation element 150, in use.

In some examples, the locking mechanism 124 is configured to be released to urge the roller from the second position to the first position in response to the driving rotational element 150 having 0 rpm. This is particularly relevant to when the driving rotational element 150 comprises a flywheel and it may be desirable to re-engage the roller 110 with the recess 104 when the flywheel has stopped (e.g. move the roller 110 back from the second position to the first position). However, even in this example an operator may decelerate the flywheel and shift a gear down prior to re-engage the roller 110 in the recess 104 at a relatively low speed.

Figure 4A:
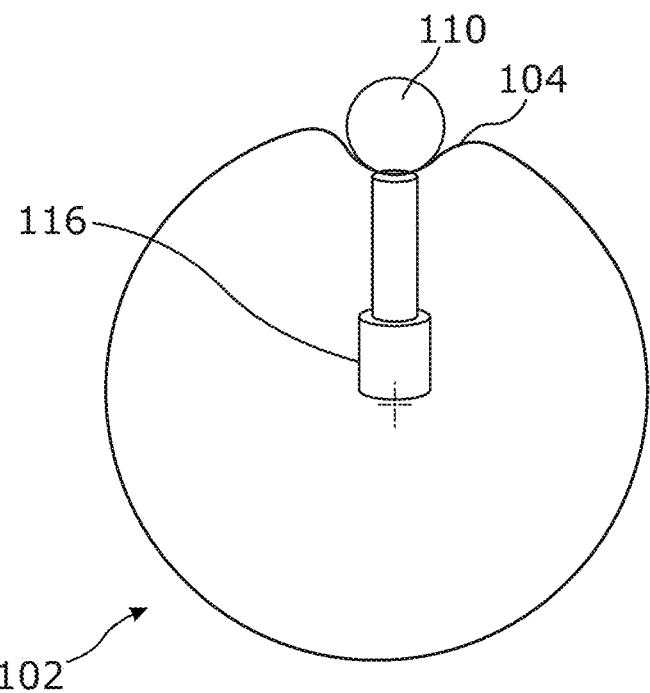
FIG. 4A shows a schematic view of an actuator of the shear clutch in which the roller is in the first position.
Figure 4B:
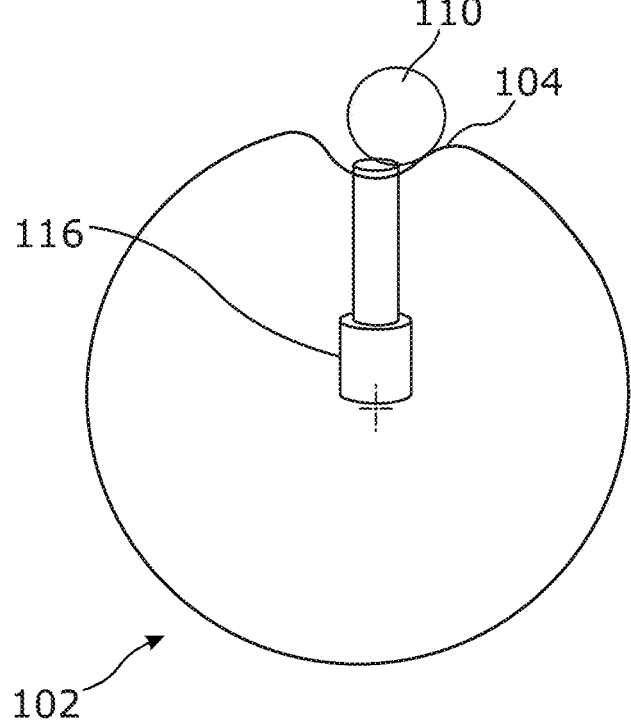
FIG. 4B shows a schematic view of the actuator of the shear clutch in which the roller is moved to an intermediate position.
Figure 4C:
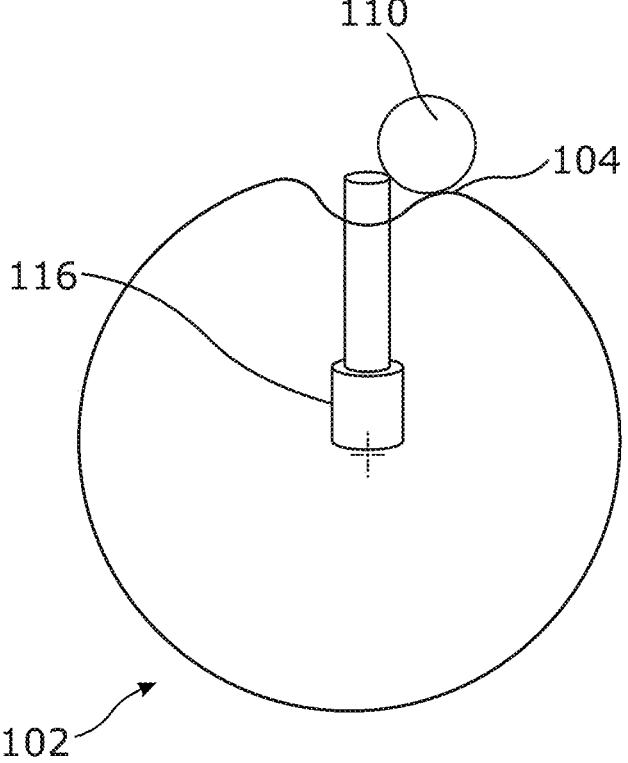
FIG. 4C shows a schematic view of the actuator of the shear clutch in which the roller is in the second position.

FIG. 3A also shows the actuator 116 (shown in more detail in FIGS. 4A to 4C). The actuator 116 may be coupled with the lever arm 118 or driving rotational element 150 at one end and is configured to provide an override force to the roller 110 in some examples. In some examples, the actuator 116 is configured to abut the roller 110, but in other examples the actuator may be configured to impart force on a part of the lever 120 that is relatively close to the roller 110.

The actuator 116 is configured to impart a force on the roller 110 (directly or indirectly) that is sufficient to overcome the biasing force provided by the biasing unit 112. In other words, the actuator 116 may be configured to push the roller 110 out of the recess 104, thereby disconnecting the link between the driving rotational element 150 (e.g. the flywheel) and driven rotational element 102.

In other words, there are two mechanisms by which the roller 110 may be unseated from the recess 104 in operation.

The use of an actuator 116 also provides a user with a way of controlling the biasing force on the roller 110. In other words, when the roller 110 is at the deepest part of the recess 104, the amount of torque required to overcome the biasing force is at a maximum. This is the case as shown in FIG. 4A.

However, the actuator 116 can be used to move the roller 110 from the deepest position of the recess 104, as shown in FIG. 4B. Away from the deepest location in the recess, the force needed to overcome the biasing force is reduced. In other words, in some examples the actuator 116 may be used to move the roller to an intermediate position within the recess 104 in which the force required to overcome the biasing force is reduced.

FIG. 4C shows the example in which the roller 110 is moved to the second position (e.g. out of the recess 104) due to the actuator 116.

Figure 5:
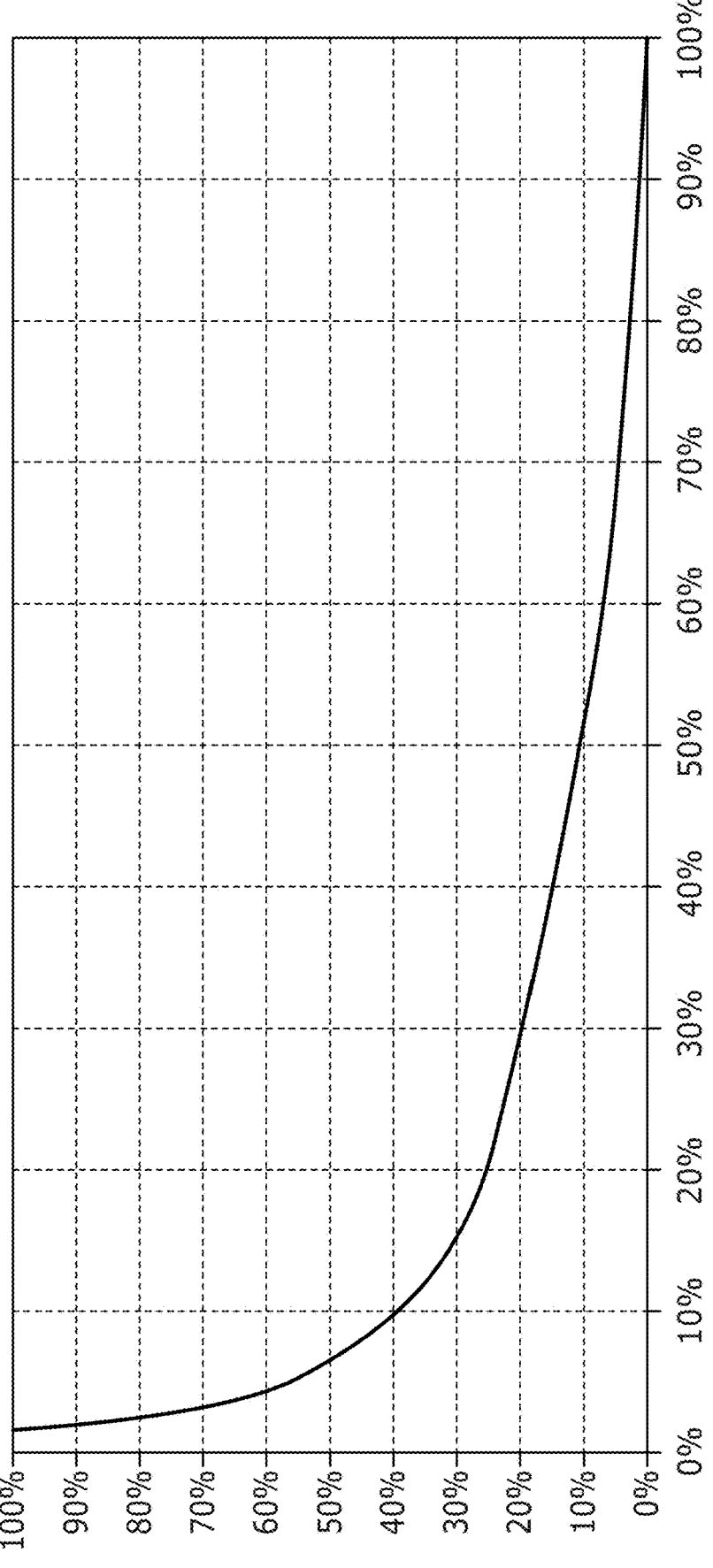
FIG. 5 shows a graph of the relationship between a force required to move the roller as a function of position of the roller within the recess.

FIG. 5 shows a graph of the relationship between relative torque required to move the roller 110 as a function of its relative position within the recess 104. In other words, at 0% on the x-axis, the roller 110 is fully inserted into the recess and the relative torque required to overcome the bias force is at a maximum. At 50% on the x-axis, the roller 110 is 50% of the way in the recess 104. At 100% on the x-axis, the roller 110 is entirely out of the recess 104 (i.e. the roller 110 is in the second position) and so the relative torque required to move the roller 110 out of the recess is 0.

As shown in the graph in FIG. 5, there is an exponential decay of the relative torque required to overcome the biasing force on the roller 110 as the roller 110 is moved position within the recess 104. The actuator 116 can be used to control the position of the roller 110 in this fashion and so provides a mechanism for the user to be able to control the relative torque required to overcome the biasing force.

As such, the actuator 116 provides additional mechanism for controlling the position of the roller 110 in the recess 104, which can significantly reduce the amount of relative torque required to overcome the biasing force. This means that the safety clutch 100 could be used in case of an emergency to disconnect the power transmission from the driving rotational element 150 (such as a flywheel) to the driven rotational element 102. For this reason, plunger stops could be reintroduced as the safety clutch 100 provides a mechanism for obviating the need to quickly dissipate the energy from a flywheel as the safety clutch 100 could now disconnect the flywheel quickly and on demand.

The actuator 116 is configured to push the roller 110 out of the recess 104 in response to an override input.

For example, if the needles are not fully retracted and the conrod crankarms are in a certain position, the safety clutch 100 could be "tripped" by activating the actuator 116 to push the roller 110 from the first position to the second position. In other words, the override input into the actuator could be a detection that there is an imminent impact between needles and the plunger stop, which could be detected by sensors and/or a lever system potentially aided by electronics. In other examples, the override input could simply be an input by an operator, for example by pressing a button, which would control the actuator 116.

If the actuator 116 pushes the roller out of the recess 104 before the impact on the plunger stop, then the energy of the flywheel does not need to be absorbed by the plungerstop. Instead, then energy could be gradually absorbed by a brake/gearbox system.

In one example, a "soft plungerstop" system can be created by connecting a main gear box of the agricultural vehicle to a mid-gearbox. In this example, the flywheel can be disconnected from the drive (by use of the shear clutch 100) and second gear is immediately released, and a brake is applied to stop the flywheel. In addition, in the case of an emergency (such as a foreign object entering the machinery), then the safety clutch 100 provides a way to immediately disconnect the driving rotational element 150 from the driven rotational element 102 to reduce the amount of possible damage.

Figure 6A:
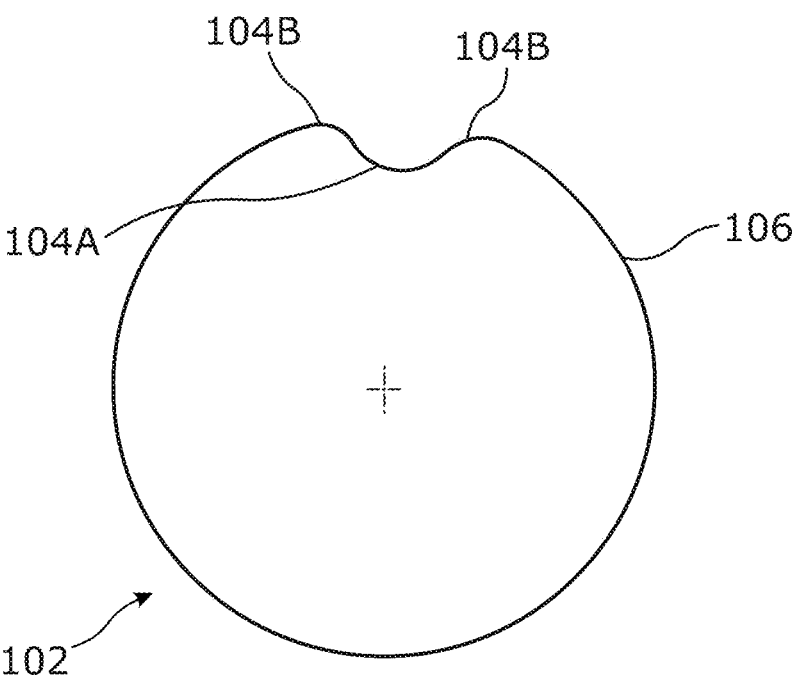
FIG. 6A shows a first example of the driven rotating element.

FIG. 6A shows a first example of the driven rotating element 102. In FIG. 6A, the recess 104 is located in the disc 104. In this example, the recess 104 is in the periphery of the disc 106. The recess 104 has a concave portion 104A adjacent to one or more convex portions 104B. In other words, the recess 104 may comprise a bearing surface on which the roller 110 may be configured to roll in operation. The recess 104 may be shaped as a semi-circle with a convex portion 140B to one side, so the roller 110 needs to roll over said convex portion 140B in order to be fully released from the recess 104 (i.e. in the second position). In other words, in the first position, the roller 110 is seated in the concave portion of the recess. However, if the relative torque is increased to a sufficient value, then the roller 110 would overcome the biasing force and roll out of the concave portion and over the convex portion 104B to be unseated.

Figure 6B:
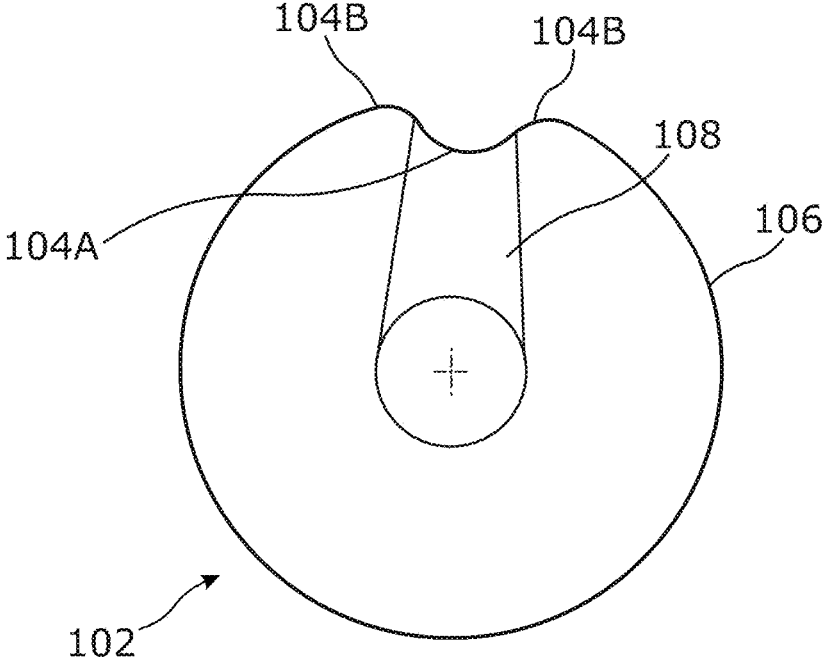
FIG. 6B shows a second example of the driven rotating element.

FIG. 6B shows another example of the driven rotational element 102 which comprises a shear arm 108 comprising the recess 104 at one end. In this example the shear arm 108 is rotationally coupled with the disc 106. In some examples, there is a recess 104 in both the disc 106 and the shear arm 108 and the roller 110 is configured to sit at least partially in both recesses.

In one example, the safety clutch 100 comprises a plurality of rollers 110. Each roller 110 is configured to be received in a correlating recess 104 in the driven rotational element. In other words, the driven rotating element 102 may comprise a plurality of recesses 104 (as described above), and each recess 104 is configured to receive a roller 110. That is to say that there may be a plurality of lever arms 118, biasing units 112 and actuators 116 each configured to bias a roller 110 into different recesses 104 within the driven rotational element 102. For example, there may be two recesses 104 offset from each other by 180 degrees and two sets of lever arms 118, biasing units 112 and actuators 116 each configured to bias a roller 110 into different recesses 104. In other examples there may be more than two recesses configures to receive a corresponding number of rollers 110.

Where more than one roller 110 is used, each may have a corresponding actuator 116 configured to move the roller 110 in use. In this way, each of the actuators 116 may be configured to move a roller 110 individually. In this way, different rollers 110 could be positioned differently. For example, a first actuator 116 of the plurality of actuators is configured to locate a first roller of the plurality of rollers in the first position, and a second actuator of the plurality of actuators is configured to locate a second roller of the plurality of rollers in the second position. Therefore, the overall relative torque between the rollers and driven rotational element 102 to overcome the biasing force could be controlled in this manner.

In one example, a plurality of safety clutches 100 could be arranged in an agricultural vehicle in an axial manner.

Figure 7:
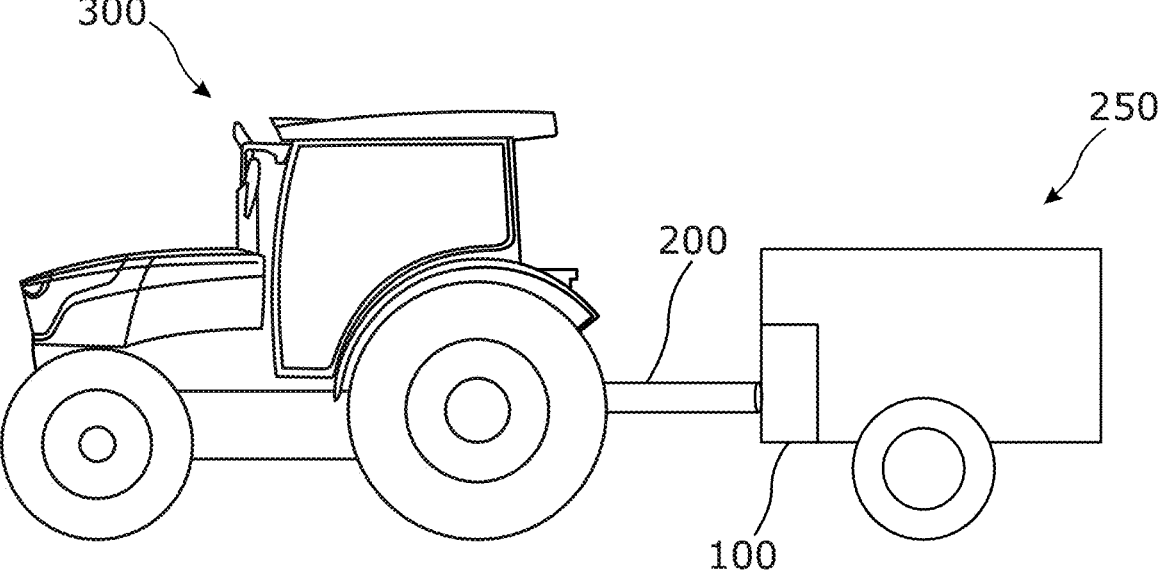
FIG. 7 shows a schematic example of the shear clutch in an agricultural vehicle.

FIG. 7 shows a schematic example of a safety clutch 100 implemented in an agricultural vehicle 250.

In one example, there is provided a method of operating the safety clutch comprising: actuating the actuator 116 to move the roller 110 from the first position to the second position.

The invention may also be described via a variety of clauses, provided here to facilitate an understanding of the invention.

Clause 1: A safety clutch (100) for an agricultural vehicle comprising:
a driven rotational element (102) comprising a recess (104); and a roller (110) configured to be received in the recess (104) of the driven rotational element (102);
wherein the safety clutch (100) comprises:
a biasing unit (112) configured to urge the roller (110) into the recess (104) with a biasing force, wherein the roller (110) is configured to move between:
a first position in which the roller (110) is seated in the recess of the driven rotational element (102) to drive the driven rotational element to rotate; and
a second position in which the roller (110) is unseated from the recess (104) of the driven rotational element (102), and
an actuator (116) operable to move the roller from the first position to the second position in response to an override input;
wherein the roller (110) is configured to move between the first position and second position in response to:
a relative torque between the roller (110) and driven rotational element (102) overcoming the biasing force; and/or
the actuator (116) moving the roller (110) in response to the override input.

Clause 2: The safety clutch (100) according to clause 1, wherein the biasing unit (112) comprises:
a pivot arm (118) comprising a pivot (122), wherein the pivot arm (118) is configured to be coupled with a driving rotational element (150);
a resiliently deformable member (114) configured to provide the biasing force; and
a lever (120) configured to pivot about the pivot (122) of the pivot arm (118),
wherein the lever (120) is coupled to the resiliently deformable member (114) on a first side of the pivot (122) and rotatably coupled with the roller (110) on a second side of the pivot (122).

Clause 3: The safety clutch (100) according to claim 2, wherein the pivot arm (118) comprises an alignment opening (140) through which a rod of the resiliently deformable member (114) is configured to extend.

Clause 4: The safety clutch (100) according to clause 2 or 3, wherein the biasing unit (112) is rotatable about a rotational axis of the driven rotational element (102).

Clause 5: The safety clutch (100) according to any one of the preceding clause, wherein the recess (104) of the driven rotational element (102) comprises a concave region (104A) adjacent to one or more convex regions (104B).

Clause 6: The safety clutch (100) according to clause 5, wherein the concave region (104A) is adjacent to one or more convex regions (104B).

Clause 7: The safety clutch (100) according to any one of the preceding clauses, wherein the driven rotational element (102) comprises a disc (106) with a recess in a periphery of the disc.

Clause 8: The safety clutch (100) according to any one of clauses 1 to 6, wherein the driven rotational element (102) comprises a shear arm (108) comprising a recess at one end, wherein the shear arm (108) is rotationally coupled with a disc (106).

Clause 9: The safety clutch (100) according to any one of the preceding clauses, wherein, in use, the driven rotational element (102) is configured to be rotated through 360 degrees about a rotational axis of the driven rotational element (102).

Clause 10: The safety clutch (100) according to any one of the preceding clauses, wherein the roller is configured to be urged against the driven rotational element (102) in the second position by the biasing force, the safety clutch (100) comprising a rotational speed monitor to determine the rotational speed of the driven rotational element (102).

Clause 11: The safety clutch (100) according to any one of clause 1 to 9, comprising a locking mechanism (124) configured to lock the roller (110) in the second position after the roller (110) has transitioned from the first position to the second position.

Clause 12: The safety clutch (100) according to clause 11, wherein the locking mechanism (124) is configured to be released to urge the roller (110) from the second position to the first position in response to a rotational speed of the driving rotational element (150) being reduced to less than a predetermined speed.

Clause 13: The safety clutch (100) according to clause 12, wherein the rotational speed of the driving rotational element (150) is reduced to below the predetermined speed by use of a gearbox between a power take-off and the driving rotation element (150).

Clause 14: The safety clutch (100) according to clauses 12 or 13, wherein the locking mechanism (124) is configured to be released to urge the roller (110) from the second position to the first position in response to the driving rotational element (150) having 0 rpm.

Clause 15: The safety clutch (100) according to any one of clauses 12, 13 or 14, wherein the driving rotational element (150) comprises a flywheel.

Clause 16: The safety clutch (100) according to any one of the preceding clauses, wherein the actuator is configured to move the roller to an intermediate position between the first and second position to reduce the amount of relative torque between the roller and driven rotational element (102) overcoming the biasing force.

Clause 17: The safety clutch (100) according to any one of the preceding clauses, wherein the safety clutch (100) comprises a plurality of rollers (110), wherein each roller is configured to be received in a correlating recess (104) in the driven rotational element (102).

Clause 18: The safety clutch (100) according to clause 17, comprising a plurality of actuators (116), wherein each actuator (116) is configured to move a corresponding roller (110).

Clause 19: The safety clutch (100) according to clause 18, wherein a first actuator of the plurality of actuators (116) is configured to situate a first roller of the plurality of rollers in the first position, and a second actuator of the plurality of actuators is configures to situate a second roller of the plurality of rollers in the second position.

Clause 20: An agricultural vehicle (250) or trailed agricultural accessory comprising the safety clutch (100) according to any one of the preceding clauses.

Clause 21: A method of operating the safety clutch (100) according to any one of clauses 1 to 19 comprising:

actuating the actuator (116) to move the roller (110) from the first position to the second position.

What is claimed is:

1. A safety clutch for an agricultural vehicle, said safety clutch comprising:

(i) a driven rotational element comprising a recess;

(ii) a roller configured to be received in the recess of the driven rotational element;

(iii) a biasing unit configured to urge the roller into the recess with a biasing force, wherein the roller is configured to move between:

a first position in which the roller is seated in the recess of the driven rotational element to drive the driven rotational element to rotate; and a second position in which the roller is unseated from the recess of the driven rotational element, and (iv) an actuator having a moveable end that is positioned against the roller and is operable to move the roller from the first position to the second position in response to an override input;

wherein the roller is configured to move between the first position and second position in response to:

(a) a relative torque between the roller and the driven rotational element overcoming the biasing force; and (b) the actuator moving the roller in response to the override input, wherein the override input is independent of the relative torque.

2. The safety clutch according to claim 1, wherein the biasing unit comprises:

a pivot arm comprising a pivot, wherein the pivot arm is configured to be coupled with a driving rotational element;

a resiliently deformable member configured to provide the biasing force; and a lever configured to pivot about the pivot of the pivot arm, wherein the lever is coupled to the resiliently deformable member on a first side of the pivot and rotatably coupled with the roller on a second side of the pivot.

3. The safety clutch according to claim 2, wherein the pivot arm comprises an alignment opening through which a rod of the resiliently deformable member is configured to extend.

4. The safety clutch according to claim 2, wherein the biasing unit is rotatable about a rotational axis of the driven rotational element.

5. The safety clutch according to claim 1, wherein the recess of the driven rotational element comprises a concave region adjacent to one or more convex regions.

6. The safety clutch according to claim 1, wherein the driven rotational element comprises a disc with the recess in a periphery of the disc.

7. The safety clutch according to claim 1, wherein the driven rotational element comprises a shear arm comprising the recess at one end thereof, wherein the shear arm is rotationally coupled with a disc.

8. The safety clutch according to claim 1, wherein, in use, the driven rotational element is configured to be rotated through 360 degrees about a rotational axis of the driven rotational element.

9. The safety clutch according to claim 1, wherein the roller is configured to be urged against the driven rotational element in the second position by the biasing force, the safety clutch further comprising a rotational speed monitor to determine a rotational speed of the driven rotational element.

10. The safety clutch according to claim 1, further comprising a locking mechanism configured to lock the roller in the second position after the roller has transitioned from the first position to the second position.

11. The safety clutch according to claim 1, wherein the actuator is configured to move the roller to an intermediate position between the first and second position to reduce the amount of relative torque between the roller and the driven rotational element overcoming the biasing force.

12. The safety clutch according to claim 1, wherein the safety clutch further comprises a plurality of rollers, wherein each roller is configured to be received in a correlating recess in the driven rotational element.

13. The safety clutch according to claim 12, further comprising a plurality of actuators, wherein each actuator is configured to move a corresponding roller of the plurality of rollers and wherein a first actuator of the plurality of actuators is configured to situate a first roller of the plurality of rollers in the first position, and a second actuator of the plurality of actuators is configured to locate a second roller of the plurality of rollers in the second position.

14. An agricultural vehicle comprising the safety clutch according to claim 1.

15. A trailed agricultural accessory comprising the safety clutch according to claim 1.

16. The safety clutch according to claim 1, wherein the actuator is a piston and the moveable end is defined on an end of the piston, wherein said end of the piston is positioned directly against the roller.

17. In a safety clutch for an agricultural vehicle, said safety clutch comprising: (i) a driven rotational element comprising a recess; (ii) a roller configured to be received in the recess of the driven rotational element; (iii) a biasing unit configured to urge the roller into the recess with a biasing force, wherein the roller is configured to move between: a first position in which the roller is seated in the recess of the driven rotational element to drive the driven rotational element to rotate; and a second position in which the roller is unseated from the recess of the driven rotational element, and (iv) an actuator having a moveable end that is positioned against the roller and is operable to move the roller from the first position to the second position in response to an override input, a method of operating the safety clutch comprises:

actuating the actuator to move the roller from the first position to the second position in response to: (a) a relative torque between the roller and the driven rotational element overcoming the biasing force; and (b) the actuator moving the roller in response to the override input, wherein the override input is independent of the relative torque.

18. The method of claim 17, wherein the actuator is a piston and the moveable end is defined on an end of the piston, wherein said end of the piston is positioned directly against the roller.

* * * * *